US012739914B2

(12) United States Patent
Dong

(10) Patent No.: US 12,739,914 B2
(45) Date of Patent: Sep. 15, 2026

(54) COMMUNICATION METHOD AND COMMUNICATION APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 330 days.

(21) Appl. No.: 18/569,452

(22) PCT Filed: Jun. 25, 2021

(86) PCT No.: PCT/CN2021/102470
§ 371 (c)(1),
(2) Date: Dec. 12, 2023

(87) PCT Pub. No.: WO2022/267033
PCT Pub. Date: Dec. 29, 2022

(65) Prior Publication Data
US 2024/0276572 A1 Aug. 15, 2024

(51) Int. Cl.
*H04W 76/15* (2018.01)
*H04W 56/00* (2009.01)
*H04W 88/10* (2009.01)

(52) U.S. Cl.
CPC ......... *H04W 76/15* (2018.02); *H04W 56/001* (2013.01); *H04W 88/10* (2013.01)

(58) Field of Classification Search
CPC .... H04W 76/15; H04W 56/001; H04W 88/10
See application file for complete search history.

(56) References Cited

U.S. PATENT DOCUMENTS 8,989,105 B2 * 3/2015 Wu ......................... H04L 5/001 455/450
11,601,999 B2 * 3/2023 Chu ...................... H04W 48/12
2020/0221545 A1 7/2020 Stacey et al.
2021/0014911 A1 1/2021 Patil et al.
2021/0368419 A1 * 11/2021 Kwon ................... H04W 48/16
2023/0403638 A1 * 12/2023 Wu ....................... H04W 48/16

FOREIGN PATENT DOCUMENTS

CN 106165495 A 11/2016
CN 111417171 A 7/2020
CN 111526514 A 8/2020

OTHER PUBLICATIONS

International Search Report and Written Opinion of International Application No. PCT/CN2021/102470, dated Dec. 27, 2021, 12 pages.

(Continued)

*Primary Examiner* — Chandrahas B Patel
(74) *Attorney, Agent, or Firm* — Finnegan, Henderson, Farabow, Garrett & Dunner, L.L.P.

(57) ABSTRACT

A communication method is performed by an access point (AP) supporting multi-link (ML) communication, and includes: determining a first message frame, wherein the first message frame includes a reduced neighbor report (RNR) element in response to a condition related to ML communication being satisfied; and sending the first message frame on a first link among multiple links.

12 Claims, 1 Drawing Sheet

(56) References Cited

OTHER PUBLICATIONS

Notice of Reasons for Refusal issued by the Japanese Patent Office on Dec. 6, 2024, in corresponding Application No. JP 2023-578124, 8 pages.
Patil, Abhishek et al., "Resolution for CID 24114", Qualcomm Inc., IEEE P802.11-20/0818r4, May 2020, 5 pages.
"Part 11: WirelessLAN Medium Access Control (MAC) and Physical Layer (PHY) Specifications", IEEE Standard for Information Technology, Telecommunications and Information Exchange between Systems Local and Metropolitan Area Networks—Specific Requirements, IEEE Std 802.11-2020, pp. 824, 879, 1297-1299, Dec. 3, 2020.
Extended European Search Report Issued in Application No. 21946525.9 dated Jul. 10, 2024, 9 pages.

* cited by examiner

AP MLD
non-AP STA MLD
AP1
Link 1
STA1
AP2
Link 2
STA2
AP3
Link 3
STA3 determining a first message frame
210
sending the first message frame
220 receiving a first message frame
310
performing a communication operation
320 communication apparatus 400
processing module 410
transceiver module 420

COMMUNICATION METHOD AND COMMUNICATION APPARATUS

CROSS-REFERENCE TO RELATED APPLICATION

This application is the U.S. National Stage Application of International Application No. PCT/CN2021/102470, filed on Jun. 25, 2021, the entire disclosure of which is incorporated herein by reference.

TECHNICAL FIELD

The disclosure relates to a field of wireless communication, and specifically to a communication method and a communication apparatus.

BACKGROUND

The current research scope of Wi-Fi technology is 320 MHz bandwidth transmission, aggregation and coordination of a plurality of frequency bands, etc. Compared to existing standards, it is expected to increase the rate and throughput by at least four times. Its main application scenarios are video transmission, augmented reality (AR), virtual reality (VR), etc.

The aggregation and coordination of the plurality of frequency bands means that communication is performed simultaneously in frequency bands such as 2.4 GHz, 5 GHz, and 6 GHz among the devices. It needs to define a new media access control (MAC) mechanism to manage the communication among the devices simultaneously in the plurality of frequency bands. In addition, it is also expected that the aggregation and coordination of the plurality of frequency bands can support low-latency transmission.

A maximum bandwidth that the current multi-band aggregation and system technology will support is 320 MHz (i.e., 160 MHz+160 MHz). In addition, 240 MHz (i.e., 160 MHz+80 MHz) and other bandwidths may also be supported.

In the related art, a station (STA) and an access point (AP) may be multi-link devices (MLDs), that is, they can perform communication on multiple links. Therefore, there may be multiple links between the STA and the AP in the related art, and communication between the two devices on multiple links is being studied.

SUMMARY

According to a first aspect of the disclosure, a communication method on multiple links may be performed by an access point (AP) supporting multi-link (ML) communication. The method includes: determining a first message frame, in which in response to a condition related to ML communication being satisfied, the first message frame includes a reduced neighbor report (RNR) element; and sending the first message frame on a first link among the multiple links.

According to a second aspect of the disclosure, a communication method on multiple links may be performed by a station (STA) supporting ML communication. The method includes: receiving a first message frame on a first link among multiple links, in which in response to a condition related to ML communication being satisfied, the first message frame includes an RNR element; and performing a communication operation based on the first message frame.

According to a third aspect of the disclosure, an access point (AP) supporting multi-link (ML) communication is provided. The AP includes a processor, and a memory stored with a computer program executable by the processor. The processor is configured to perform the method as described in the above first aspect.

BRIEF DESCRIPTION OF THE DRAWINGS

The above and other features of embodiments of the disclosure will be more apparent by describing in detail example embodiments of the disclosure with reference to the accompanying drawings.

DETAILED DESCRIPTION

Figures 1, 2, 3, 4:
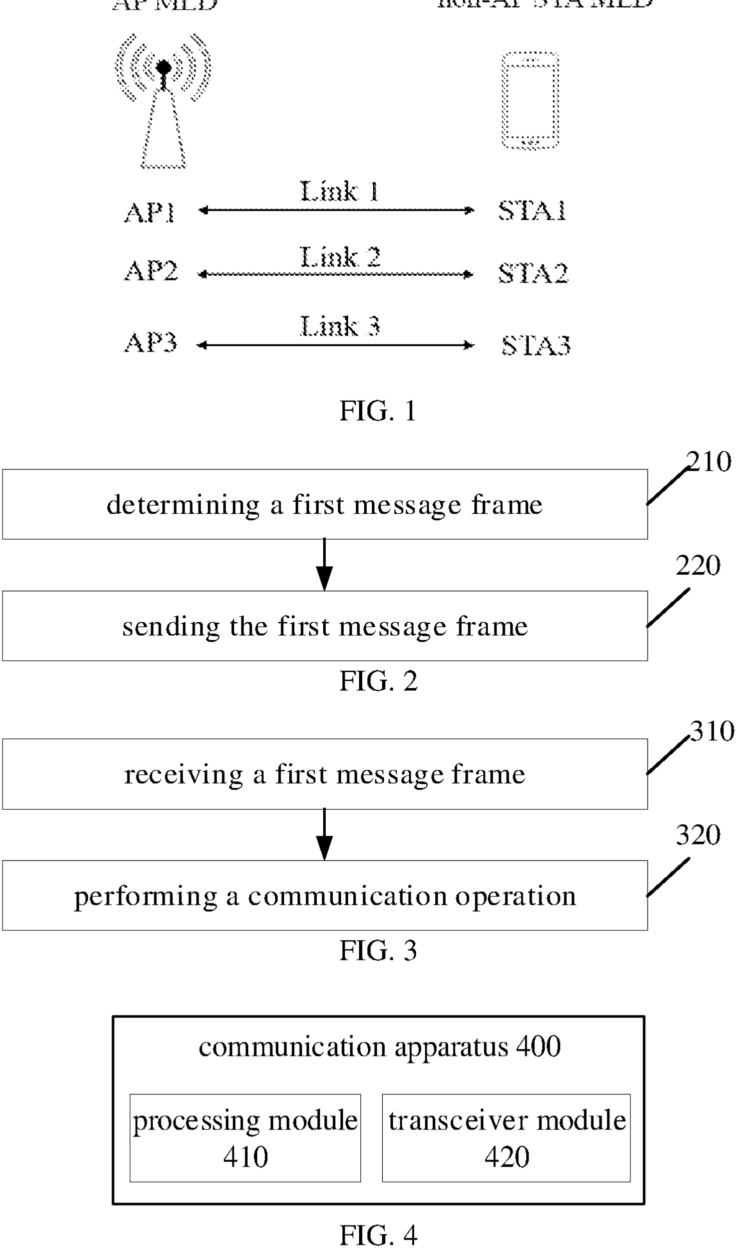
FIG. 1 is a diagram illustrating a communication scenario on multiple links according to an embodiment.
FIG. 2 is a flowchart of a communication method according to an embodiment.
FIG. 3 is a flowchart of another communication method according to an embodiment.
FIG. 4 is a block diagram of a communication apparatus according to an embodiment.

The following description with reference to the accompanying drawings is provided to assist in a comprehensive understanding of various embodiments of the disclosure as defined by appended claims and their equivalents. The various embodiments of the disclosure include various specific details, but these specific details are considered to be exemplary only. Additionally, descriptions of well-known techniques, functions, and constructions may be omitted for the sake of clarity and conciseness.

The terms and words used in this disclosure are not limited to written meanings, but are merely used by the inventor to enable a clear and consistent understanding of the disclosure. Accordingly, for those skilled in the art, the description of the various embodiments of the disclosure is provided for illustration purpose only and not for a purpose of limitation.

It will be understood that, the singular forms "a/an," "the" and "said" as used herein may include the plural forms as well, unless the context clearly dictates otherwise. It should be further understood that the word "include" as used in this disclosure refers to a presence of the described features, integers, steps, operations, elements and/or components but does not exclude a presence or addition of one or more other features, integers, steps, operations, elements, components and/or a group of them.

It will be understood that, although the terms "first," "second," etc. may be used herein to describe various elements, these elements should not be limited by these terms. These terms are only used to distinguish one element from another. Accordingly, a first element discussed below may be referred to as a second element without departing from the teachings of example embodiments.

It will be understood that when an element is referred to as being "connected" or "coupled" to another element, it may be directly connected or coupled to the other element or there may also be an intermediate element between the elements. Additionally, "connected" or "coupled" as used herein may include wireless connections or wireless couplings. As used herein, the term "and/or" or the expression "at least one/at least one of" includes any and all combinations of one or more of the associated listed items.

Unless otherwise defined, all the terms (including technical and scientific terms) used herein have the same meaning as commonly understood by one of ordinary skill in the art to which this disclosure belongs.

FIG. 1 is an exemplary diagram illustrating a communication scenario on multiple links according to an embodiment.

In a wireless LAN, one basic service set (BSS) may consist of an access point (AP) and one or more stations (STAs) that communicate with the AP. One BSS can be linked to a distribution system (DS) through its AP, and then accessed to another BSS to form an extended service set (ESS).

AP is a wireless switch used in a wireless network and is also an access point of the wireless network. The AP device may be used as a wireless base station, mainly as a bridge used to link wireless networks and wired networks. The wired and wireless networks may be integrated using such AP.

The AP may include software applications and/or circuitry to enable other types of nodes in the wireless network to communicate with external parts and internal parts of the wireless network via the AP. In some examples, the AP may be for example, a terminal device or a network device equipped with a wireless fidelity (Wi-Fi) chip.

As an example, the STA may include, but is not limited to, a cellular phone, a smartphone, a wearable device, a computer, a personal digital assistant (PDA), a personal communication system (PCS) device, a personal information manager (PIM), a personal navigation device (PND), a GPS, a multimedia device, an Internet of Things (IoT) device, etc.

In embodiments of the disclosure, the AP and the STA may be MLD devices that support multi-link communication, for example, may be represented as AP MLD and non-AP STA MLD, respectively. For ease of description, an example in which one AP communicates with one STA on multiple links is mainly described below. However, it is not limited to the embodiments of the disclosure.

In FIG. 1, for example only, AP MLD may represent an AP that supports multi-link communication, and non-AP STA MLD may represent an STA that supports multi-link communication. Referring to FIG. 1, the AP MLD may work on three links, such as AP1, AP2, and AP3 as shown in FIG. 1. The non-AP STA MLD may also work on three links, such as STA1, STA2, and STA3. In the example of FIG. 1, it is assumed that the AP1 communicates with the STA1 through a corresponding first link (i.e., Link 1). Similarly, the AP2 communicates with the STA2 through a second link (i.e., Link 2), and the AP3 communicates with the STA3 through a third link (i.e., Link 3). In addition, Link 1 to Link 3 may be multiple links at different frequencies, for example, links at 2.4 GHz, 5 GHz, 6 GHz, etc., or several links with the same or different bandwidths at 2.4 GHz, 5 GHz, and 6 GHz. Additionally, there may be a plurality of channels on each link. However, it should be understood that the communication scenario shown in FIG. 1 is only exemplary, which is not limited to the inventive concept. For example, the AP MLD may be linked to multiple non-AP STA MLDs, or the AP may communicate with multiple other types of STAs on each link.

A power management (PM) mode of STA affiliated with a same non-AP STA MLD on each link is different. For example, each STA of a non-AP STA MLD that is operating on an enabled link shall maintain its own PM mode and power states. Frame exchanges on an enabled link are possible when the STA of the non-AP STA MLD operating on that link is in an awake state.

A listen interval of the non-AP STA MLD is an MLD level. That is, the listen interval of the STA affiliated with the same non-AP STA MLD on each link is the same, but a period of the STA listening to a beacon frame sent by each AP on each link may be different. During multi-link (re) setup, the value carried in a listen interval field in a (re) association request frame sent by a STA affiliated with a non-AP STA MLD to an AP affiliated with an AP MLD is requested at the MLD level. The AP affiliated with the AP MLD may reject multi-link setup because the listen interval requested by the non-AP STA MLD is too large. After successful multi-link (re)setup, the AP MLD shall use the listen interval in determining the lifetime of frames it buffers for the non-AP STA MLD.

Since the non-AP STA MLD completes the associated link (multi-link setup) with the AP MLD, the STA (except for the STA used in multi-link setup) on each link is immediately in a PS state, so the STA on each link needs to know a beacon interval of its corresponding AP, so that the STA can wake up in time and listen to a beacon frame broadcast by the AP.

The AP MLD can work on different links simultaneously (eMLMR: enhanced-multilink multi-radio) or work on different links in a time division multiplexing manner (eMLSR: enhanced-multilink single radio), and the non-AP STA MLD associated with the AP MLD needs to listen to the beacon frame broadcast by the AP on each link. However, the related art cannot meet the requirement of working on multiple links. In view of this, the communication method and communication apparatus of the disclosure are provided.

FIG. 2 is a flowchart of a communication method according to an embodiment. The communication method shown in FIG. 2 can be applied to an AP MLD that supports multi-link communication.

Referring to FIG. 2, in step 210, a first message frame may be determined. According to an embodiment of the disclosure, the first message frame may be a beacon frame, a probe response, or a multi-link (ML) probe response frame, which is however not limited in the disclosure.

In the embodiments of the disclosure, there may be many ways to determine the first message frame. For example, the first message frame may be generated according to at least one of: network conditions, load conditions, and hardware capabilities of sending/receiving device, service types, and relevant protocol provisions, which is not limited by the embodiments of the disclosure. In the embodiments of the disclosure, the first message frame can also be obtained from an external device, which is not limited by the embodiments of the disclosure.

According to an embodiment of the disclosure, in response to a condition related to ML communication being satisfied, the first message frame may include a reduced neighbor report (RNR) element. For example, RNR information may be carried in the first message frame in the form of an element. However, the disclosure is not limited to this, and the RNR information can also be carried in other forms. The RNR element may contain a time offset value of a beacon frame broadcast by a neighbor AP. The station may learn a beacon interval of the AP through the time offset value, so as to wake up in time to listen to the beacon frame broadcast by the AP. Therefore, the method according to the disclosure may determine whether the RNR element is carried in the first message frame or not based on the condition related to ML communication. The embodiments about the condition related to ML communication and the RNR element will be described in detail later.

In step 220, a first message frame may be sent on a first link among multiple links. The multiple links may refer to a plurality of links that the AP MLD sets up with the non-AP STA MLD for ML communication. The first link may refer to a link in an enabled state for sending the first message frame, which may also be referred to as "the current/present link".

According to embodiments of the disclosure, the condition related to ML communication may include at least one of: setting an RNR execution primitive for co-located APs working on different links simultaneously or in a time-sharing manner to a specific value; or carrying a ML element in the first message frame.

In the embodiments of the disclosure, the RNR execution primitive for co-located APs working on different links simultaneously or in a time division multiplexing manner can be set to a specific value at the MAC layer (for example, "1 (true)"), and the co-located APs can refer to APs affiliated with the same AP MLD working on different links (such as AP1, AP2, and AP3 shown in FIG. 1). For example, the APs can work on different links simultaneously (eMLMR) or work on different links in a time division multiplexing manner (eMLSR). In the embodiments of the disclosure, the co-located APs may correspond to APs working on multiple links, so that the mechanism in which RNR elements appear can be applicable to ML communication.

According to an embodiment of the disclosure, when the condition related to ML communication (setting the RNR execution primitive for co-located APs working on different links simultaneously or in a time division multiplexing manner to a specific value, e.g., "1") is satisfied, the first message frame includes the RNR element. For example, when determining the first message frame, the source language can be called, and it can be determined whether the RNR element is carried based on a setting of the source language.

According to an embodiment of the disclosure, when the condition related to ML communication is satisfied (carrying the ML element in the first message frame), the first message frame includes the RNR element. That is to say, if the first message frame carries the ML element, the first message frame also carries the RNR element. The ML element may carry ML configuration information, for example, an MAC address of the AP MLD, a link identifier of each link among the multiple links, and/or an MAC address of each link, etc.

According to an embodiment of the disclosure, when the two conditions related to ML communication (setting the RNR execution primitive for co-located APs working on different links simultaneously or in a time division multiplexing manner to the specific value, and carrying the ML element in the first message frame) are satisfied, the first message frame includes the RNR element.

It will be understood that the above-mentioned conditions related to ML communication are only exemplary, which are not limited in the disclosure. For example, taking the first message frame as a beacon frame as an example, the RNR element can be described as in Table 1 below.

TABLE 1

| RNR element in a beacon frame | | |
|---|---|---|
| order | information | description |
| 63 | RNR element | A: One or more Reduced Neighbor Report elements are optionally present if dot11TVHTOptionImplemented or, dot11FILSActivated or dot11ColocatedRNRImplemented is true (i.e., 1); otherwise not present;<br>B: One or more Reduced Neighbor Report elements are optionally present if dot11TVHTOptionImplemented or, dot11FILSActivated is true or the Basic variant Multi-Link element is present; otherwise not present.<br>C: One or more Reduced Neighbor Report elements are optionally present if dot11TVHTOptionImplemented or dot11FILSActivated or dot11ColocatedRNRImplemented is true and/or the Basic variant Multi-Link element is present; otherwise not present. |

In Table 1, the conditions when the RNR element is located in the 63rd order of the beacon frame are listed. "dot11TVHTOptionImplemented" may indicate an execution primitive of MAC layer management entity (MLME), "dot11FILSActivated" may indicate an active primitive of fast initial link setup, and "dot11ColocatedRNRImplemented" may indicate an RNR execution primitive for co-located APs described in the above embodiments working on different links simultaneously or in a time division multiplexing manner. The three items may be set in the MAC layer. "Basic variant Multi-Link element" may indicate an ML element. Each condition in the third column of Table 1 is only illustrative of the embodiments of the disclosure, rather than limiting to the embodiments of the disclosure.

When the first message frame is a probe response frame or a ML probe response frame, conditions for presence of the RNR element may be set similar to Table 1, but an order of an RNR element in a frame can be adaptively changed.

In ML communication, the time offset value of the beacon frame broadcast by the neighbor AP is carried via the RNR element. In order to make the first message frame include the RNR element, the communication method in the disclosure defines the RNR execution primitive for co-located APs working on different links simultaneously or in a time division multiplexing manner, and also defines including the RNR element when the ML element is present, so that the presence of the RNR element can be applied to ML communication, so as to achieve listening to the beacon frames on multiple links.

According to an embodiment of the disclosure, the RNR element may include an AP beacon interval information identifier on each of other links than the first link among the multiple links.

The RNR element may include one or more neighbor AP information fields. Each neighbor AP information field may include a target beacon transmission time (TBTT) information field. The TBTT information field may carry a time offset value of a beacon frame broadcast by a neighbor AP. In the embodiments of the disclosure, the neighbor APs may refer to APs on other links than the first link among the multiple links supported by the AP MLD. As a non-limiting example only, the TBTT information field in the RNR element may have a format shown in Table 2 below.

TABLE 2

| The format of the TBTT information field | | | | | | |
|---|---|---|---|---|---|---|
| | Neighbor AP TBTT Offset | BSSID (optional) | Short SSID (optional) | BSS parameter (optional) | 20 MHz PSD | MLD Parameters |
| Octets: | 1 | 0 or 6 | 0 or 4 | 0 or 1 | 0 or 1 | 0 or 3 |

It can be understood that each item shown in Table 2 exists independently. These items are exemplarily listed in the same table, but it does not mean that all the items in the table must exist at the same time as shown in the table. The value of each item is independent of the value of any other item in the table. Therefore, those skilled in the art can understand that the value of each item in the disclosed table is an independent embodiment.

Referring to Table 2, a subfield of the neighbor AP TBTT offset may correspond to the AP beacon interval information identifier. According to the embodiments of the disclosure, AP beacon interval information on the present link (the first link) can be directly carried in the first message frame, and AP beacon interval information on other links can be carried in the RNR element. According to an embodiment of the disclosure, the AP beacon interval information identifier on each of the other links may be set with reference to a time point when the first message frame is sent on the first link. In other words, a beacon interval on each of the other links may be set by taking a time point of sending a beacon frame or a probe response frame or an ML probe response frame on the first link as a reference point. For example, the Neighbor AP TBTT Offset may be a time offset value for a time point when the AP on each of the other links sends the beacon frame relative to a time point when the AP on the first link sends the beacon frame. For example, as shown in FIG. 1, the AP MLD includes three affiliated APs, namely AP1, AP2, and AP3. The non-AP STA MLD also includes three affiliated STAs, namely STA1, STA2, and STA3. The AP MLD and non-AP STA MLD has completed the ML setup. For example, AP1 is associated with STA1, STA2 is associated with AP2, and AP3 is associated with STA3, but on one link, for example, Link 1 (that is, a link for AP1 that is associated with STA1), a beacon frame transmission interval of AP1 is 100 ms. If the TBTT information field contains a TBTT time offset value of AP2 corresponding to Link 2, such as 30 ms, AP2 awaits 30 ms after AP1 finishes sending the beacon frame and sends a beacon frame. However, the disclosure is not limited to this. For example, the TBTT information field of the RNR element may also directly carry a beacon frame transmission interval of the corresponding AP on the link.

In addition, the TBTT information field may optionally include a BSSID, a short SSID, a BSS parameter, a 20 MHz PSD and/or a MLD parameter. The MLD parameter may include an MLD ID, a Link ID, a BSS parameter change count value, etc.

According to an embodiment of the disclosure, the first message frame may also include timing synchronization parameter information (e.g., Timing Synchronization Function, TFS), which is used for timing synchronization of the multiple links. In the embodiment of the disclosure, the multiple links may refer to a plurality of links that the AP MLD sets up with the non-AP STA MLD for ML communication, such as Link 1 to Link 3 as shown in FIG. 1. By setting the multiple links (for example, Link 1 to Link 3) to timing synchronization, the first message frame may be sent on each of the other links with reference to a time point when the AP on the first link sends the first message frame and the corresponding TBTT time offset value, and the TBTT time offset value is carried in the RNR element, so that the corresponding STA knows the beacon frame transmission interval or period, and thus wakes up regularly to receive the beacon frame.

The communication method according to the embodiments of the disclosure defines the condition for the presence of the RNR element, and sets the AP beacon interval information on the multiple links, so that the STA on the multiple links can learn a time point when the corresponding AP broadcasts a beacon frame for subsequent listening, which is suitable for ML communication environment.

FIG. 3 is a flowchart of another communication method according to an embodiment. The communication method shown in FIG. 3 may be applied to a STA supporting ML communication, i.e., a non-AP STA MLD.

Referring to FIG. 3, in step 310, a first message frame may be received on a first link among multiple links. In response to a condition related to ML communication being satisfied, the first message frame includes an RNR element.

According to an embodiment of the disclosure, the condition related to ML communication may include at least one of: setting an RNR execution primitive for co-located APs working on different links simultaneously or in a time division multiplexing manner to a specific value, or carrying an ML element in the first message frame.

However, the disclosure is not limited to the above. For example, the first message frame may carry the RNR element similar to the embodiment of Table 1 above.

According to an embodiment of the disclosure, the RNR element may include an AP beacon interval information identifier on each of other links than the first link among the multiple links.

According to an embodiment of the disclosure, the AP beacon interval information identifier on each of links is set with reference to a time point when the first message frame is sent on the first link.

According to an embodiment of the disclosure, the first message frame further includes timing synchronization parameter information, in which the timing synchronization parameter information is used for timing synchronization of the multiple links.

It will be understood that the embodiments about the first message frame, the condition related to ML communication, the RNR element, the AP beacon interval information identifier, etc. in FIG. 3 may be similar to the embodiments described with reference to FIG. 2, which are not repeated here to avoid the redundancy.

In step 320, a communication operation may be performed based on the first message frame. For example, the STA can learn, based on the information carried in the first message frame (for example, RNR element), a time interval at which the AP on each link broadcasts the beacon frame and set a listen interval based on the time interval, to regularly wake up to receive a beacon frame broadcast by the AP.

FIG. 4 is a block diagram illustrating a communication apparatus according to an embodiment of the disclosure. Referring to FIG. 4, the communication apparatus 400 may include a processing module 410 and a transceiver module 420. The apparatus shown in FIG. 4 can be applied to an AP MLD or a non-AP STA MLD.

In the case where the communication apparatus shown in FIG. 4 is applied to the AP MLD, the processing module 410 may be configured to determine a first message frame, in which in response to a condition related to ML communication being satisfied, the first message frame includes an RNR element; the transceiver module 420 may be configured to send the first message frame on a first link among multiple links. In this case, the communication module 400 may perform the communication method described with reference to FIG. 2. For the sake of simplicity, repeated description is omitted here. It will be understood that the embodiments about the first message frame, the condition related to ML communication, the RNR element, the AP beacon interval information identifier, etc. here may be similar to the embodiments described with reference to FIG. 2, which are not repeated here to avoid the redundancy.

In the case where the communication apparatus shown in FIG. 4 is applied to the non-AP STA MLD, the transceiver module 420 may be configured to: receive a first message frame on a first link among multiple links, in which in response to a condition related to ML communication being satisfied, the first message frame includes an RNR element; and the processing module 410 may be configured to control execution of a communication operation based on the first message frame. In this case, the communication apparatus 400 may perform the communication method described with reference to FIG. 3. For the sake of simplicity, repeated description is omitted here. It will be understood that the embodiments about the first message frame, the condition related to ML communication, the RNR element, the AP beacon interval information identifier, etc. here may be similar to the embodiments described with reference to FIG. 3, which are not repeated here to avoid the redundancy.

In addition, the communication apparatus 400 shown in FIG. 4 is only exemplary, which is not limited in the embodiments of the disclosure. For example, the communication apparatus 400 may also include other modules, such as a memory module and the like. Furthermore, individual modules in the communication apparatus 400 may be combined into more complex modules, or may be divided into more individual modules.

The communication method and communication apparatus according to the embodiments of the disclosure define the condition for the presence of the RNR element, and set the AP beacon interval information on the one ore more links, so that the STA on the one ore more links can learn a time point when the corresponding AP broadcasts a beacon frame for subsequent listening, which is suitable for ML communication environments and may improve the spectrum utilization rate.

Based on the same principles as the methods according to the embodiments of the disclosure, the embodiments of the disclosure also provide an electronic device. The electronic device includes a processor and a memory that stores machine-readable instructions (also can be referred to as a "computer programs"). When the machine-readable instructions are executed by the processor, the methods described with reference to FIG. 2 and FIG. 3 are implemented.

The embodiments of the disclosure also provide a computer-readable storage medium having a computer program stored. When the computer program is executed by a processor, the methods described with reference to FIG. 2 and FIG. 3 are implemented.

In embodiments, the processor may be used to implement or execute various example logical blocks, modules and circuits described in conjunction with the disclosure, such as a central processing unit (CPU), a general-purpose processor, a data signal processor (DSP), an application specific integrated circuit (ASIC), a field programmable gate array (FPGA) or other programmable logic devices, transistor logic devices, hardware components or any combination of them. The processor can also be a combination that implements computing functions, such as a combination of one or more microprocessors, a combination of a DSP and a microprocessor, etc.

In embodiments, the memory may be, for example, a read only memory (ROM), a random access memory (RAM), an electrically erasable programmable read only memory (EEPROM), a compact disc read only memory (CD-ROM) or other optical disc storage, optical disc storage (including compressed optical discs, laser discs, optical discs, digital versatile discs, Blu-ray discs, etc.), magnetic disk storage media or other magnetic storage devices, or any other media that can be used to carry or store program codes in the form of instructions or data structures that can be accessed by a computer, which is not limited in the disclosure.

It should be understood that although various steps in the flowchart of the accompanying drawings are shown in order as indicated by arrows, these steps are not necessarily performed in the order indicated by arrows. Unless explicitly stated in this text, the execution of these steps is not strictly limited in order and can be executed in other orders. In addition, at least some of the steps in the flowchart of the accompanying drawings may include a plurality of sub-steps or a plurality of stages. These sub-steps or stages are not necessarily executed at the same time, but may be executed at different times, and their execution orders do not necessarily need to be performed sequentially, but may be performed in turn or alternately with other steps or sub-steps of other steps or at least part of the stages.

While the disclosure has been illustrated and described with reference to certain embodiments of the disclosure, those skilled in the art may understand that various changes may be made in form and detail without departing from the scope of the disclosure. Therefore, the scope of the disclosure should not be limited to the embodiments, but should be defined by the appended claims and their equivalents.

The invention claimed is:

1. A communication method, performed by an access point (AP) supporting multi-link (ML) communication, the method comprising:

determining a first message frame, wherein the first message frame comprises a reduced neighbor report (RNR) element in response to a condition related to ML communication being satisfied; and sending the first message frame on a first link among multiple links;

wherein the RNR element comprises an AP beacon interval information identifier on each of other links than the first link among the multiple links; wherein the AP beacon interval information identifier on each of other links is set with reference to a time point when the first message frame is sent on the first link.

2. The method according to claim 1, wherein the condition related to ML communication comprises at least one of:

setting an RNR execution primitive for co-located APs working on different links simultaneously or in a time division multiplexing manner to a specific value; or carrying an ML element in the first message frame.

3. The method according to claim 1, wherein the first message frame further comprises timing synchronization parameter information, wherein the timing synchronization parameter information is used for timing synchronization of the multiple links.

4. A non-transitory computer-readable storage medium storing a computer program, wherein when the computer program is executed by a processor, the method according to claim 1 is performed.

5. A communication method, performed by a station (STA) supporting multi-link (ML) communication, the method comprising:

receiving a first message frame on a first link among multiple links, wherein the first message frame comprises a reduced neighbor report (RNR) element in response to a condition related to ML communication being satisfied; and performing a communication operation based on the first message frame;

wherein the RNR element comprises an access point (AP) beacon interval information identifier on each of other links than the first link among the multiple links; wherein the AP beacon interval information identifier on each of other links is set with reference to a time point when the first message frame is sent on the first link.

6. The method according to claim 5, wherein the first message frame further comprises timing synchronization parameter information, wherein the timing synchronization parameter information is used for timing synchronization of the multiple links.

7. The method according to claim 5, wherein the condition related to ML communication comprises at least one of:

setting an RNR execution primitive for co-located access points (APs) working on different links simultaneously or in a time division multiplexing manner to a specific value; or carrying an ML element in the first message frame.

8. A station supporting multi-link (ML) communication, comprising:

a processor; and a memory storing a computer program executable by the processor, wherein the processor is configured to perform the method according to claim 5.

9. A non-transitory computer-readable storage medium storing a computer program, wherein when the computer program is executed by a processor, the method according to claim 5 is performed.

10. An access point (AP) supporting multi-link (ML) communication, comprising:

a processor; and a memory storing a computer program executable by the processor, wherein the processor is configured to:

determine a first message frame, wherein the first message frame comprises a reduced neighbor report (RNR) element in response to a condition related to ML communication being satisfied; and send the first message frame on a first link among multiple links;

wherein the RNR element comprises an AP beacon interval information identifier on each of other links than the first link among the multiple links; wherein the AP beacon interval information identifier on each of other links is set with reference to a time point when the first message frame is sent on the first link.

11. The AP according to claim 10, wherein the condition related to ML communication comprises at least one of:

setting an RNR execution primitive for co-located APs working on different links simultaneously or in a time division multiplexing manner to a specific value; or carrying an ML element in the first message frame.

12. The AP according to claim 10, wherein the first message frame further comprises timing synchronization parameter information, wherein the timing synchronization parameter information is used for timing synchronization of the multiple links.

* * * * *